(12) United States Patent
Olson et al.

(10) Patent No.: US 11,224,210 B2
(45) Date of Patent: Jan. 18, 2022

(54) ADJUSTABLE DEPTH FISHING LURE

(71) Applicant: Olson IP Technologies, Inc., Mundelein, IL (US)

(72) Inventors: Richard Carl Olson, Deerfield Beach, FL (US); Erik Olson, Deerfield Beach, FL (US)

(73) Assignee: Olson IP Technologies, Inc., Mundelein, IL (US)

( * ) Notice: Subject to any disclaimer, the term of this patent is extended or adjusted under 35 U.S.C. 154(b) by 256 days.

(21) Appl. No.: 16/291,184

(22) Filed: Mar. 4, 2019

(65) Prior Publication Data

US 2019/0269112 A1 Sep. 5, 2019

Related U.S. Application Data

(60) Provisional application No. 62/637,845, filed on Mar. 2, 2018.

(51) Int. Cl.
*A01K 85/00* (2006.01)
*A01K 85/16* (2006.01)
*A01K 85/18* (2006.01)
*A01K 95/00* (2006.01)

(52) U.S. Cl.
CPC .............. *A01K 85/00* (2013.01); *A01K 85/16* (2013.01); *A01K 85/18* (2013.01); *A01K 95/00* (2013.01)

(58) Field of Classification Search
CPC ........ A01K 85/00; A01K 95/00; A01K 85/16; A01K 85/18
USPC .................................. 43/42.47, 42.22, 42.23
See application file for complete search history.

(56) References Cited

U.S. PATENT DOCUMENTS

| | | | |
|---|---|---|---|
| 1,114,698 A | 10/1914 | Lane |
| 1,333,154 A | 3/1920 | Buddle |
| 1,418,229 A | 5/1922 | Buddle |
| 1,948,005 A | 2/1934 | Pflueger |
| 2,005,554 A | 6/1935 | Milner |
| 2,257,403 A | 9/1941 | Vandine |
| 2,290,433 A | 7/1942 | Jeffers |
| 2,402,730 A | 6/1946 | David |
| 2,499,718 A | 3/1950 | Boshears |

(Continued)

FOREIGN PATENT DOCUMENTS

| JP | H10108591 | 4/1998 |
|---|---|---|
| WO | 2015153941 | 10/2015 |

OTHER PUBLICATIONS

"Pictures of CableCuff Pro®." The cable clamp being publicly available before Oct. 2015, 4 pages.

*Primary Examiner* — Darren W Ark
*Assistant Examiner* — Zoe Tam Tran
(74) *Attorney, Agent, or Firm* — Fitch, Even, Tabin & Flannery LLP

(57) ABSTRACT

An adjustable depth fishing lure including a lip and a lure body is provided. The lip is partially received in a slot of the lure body and is movable to predetermined positions relative to the lure body. The lip may include an eyelet. The lip includes a locking member and the lure body includes a plurality of teeth. The locking member is configured to engage at least one of the teeth to fix the lip relative to the lure body at one of the predetermined positions. This engagement between the locking member and the teeth provides a rigid connection that resists loading applied to the lip by the fisherman pulling on the fishing line and/or a fish biting a hook connected to the lure body.

14 Claims, 7 Drawing Sheets

(56) References Cited

U.S. PATENT DOCUMENTS

| | | | | |
|---|---|---|---|---|
| 2,523,949 | A | 9/1950 | William | |
| 2,575,626 | A | 11/1951 | Isaac | |
| 2,588,526 | A | 3/1952 | Hoage | |
| 2,608,016 | A | 8/1952 | Shipley | |
| 2,694,876 | A | 11/1954 | Grasser | |
| 2,694,877 | A | 11/1954 | Wise | |
| 2,755,593 | A | 7/1956 | Thurman | |
| 2,767,503 | A | 10/1956 | Fisher | |
| 2,927,392 | A | 3/1960 | Lievense | |
| 3,040,467 | A | 6/1962 | Norton | |
| 3,289,346 | A | 12/1966 | Ehling | |
| 3,388,495 | A | 6/1968 | Minser | |
| 3,462,871 | A | 8/1969 | Raymon | |
| 3,727,339 | A | 4/1973 | Le Master | |
| 3,744,175 | A | 7/1973 | Bellah | |
| 3,760,529 | A | 9/1973 | Hicks | |
| 3,769,739 | A | 11/1973 | John | |
| 3,841,012 | A | 10/1974 | Maled | |
| 3,902,267 | A | 9/1975 | Monchil | |
| 3,950,882 | A | 4/1976 | Monchil | |
| 3,999,324 | A * | 12/1976 | Wagner | A01K 85/16 43/42 |
| 4,141,171 | A | 2/1979 | Muddiman | |
| 4,155,191 | A | 5/1979 | Arlie | |
| 4,155,192 | A | 5/1979 | Varaney | |
| 4,215,507 | A | 8/1980 | Russell | |
| 4,223,469 | A | 9/1980 | Luz | |
| 4,468,880 | A * | 9/1984 | Olszewski | A01K 91/04 43/42.08 |
| 4,562,661 | A * | 1/1986 | Messinger | A01K 85/16 43/35 |
| 4,697,378 | A * | 10/1987 | Tunstall | A01K 85/16 43/42.06 |
| 4,731,948 | A | 3/1988 | Helton | |
| 4,738,047 | A | 4/1988 | Ryan | |
| 4,742,638 | A * | 5/1988 | Vobejda | A01K 85/16 43/42.06 |
| 4,777,761 | A * | 10/1988 | Renaud | A01K 85/16 43/42.03 |
| 4,807,387 | A * | 2/1989 | Dougherty, Jr. | A01K 85/16 43/42.06 |
| 4,862,629 | A | 9/1989 | Ryan | |
| 4,870,776 | A | 10/1989 | Herold | |
| 5,115,592 | A | 5/1992 | Renaud | |
| 5,216,830 | A | 6/1993 | Brott, II | |
| 5,218,778 | A * | 6/1993 | Szantor | A01K 85/02 43/42.41 |
| 5,329,721 | A * | 7/1994 | Smith | A01K 85/16 43/42.22 |
| 5,337,508 | A * | 8/1994 | Pfeiffer | A01K 85/16 43/42.03 |
| 5,566,496 | A * | 10/1996 | Rutherford | A01K 85/16 43/42.09 |
| 5,600,916 | A | 2/1997 | Smith | |
| 5,829,183 | A * | 11/1998 | Guerin | A01K 85/18 43/42.35 |
| D405,497 | S | 2/1999 | Phelps | |
| 5,937,569 | A | 8/1999 | Michael | |
| 6,101,684 | A | 8/2000 | Ginocchio | |
| 6,101,758 | A * | 8/2000 | Finley | A01K 85/16 43/42.22 |
| 6,385,896 | B1 | 5/2002 | Thomassin | |
| 6,484,434 | B1 | 11/2002 | Elges | |
| 6,804,910 | B1 | 10/2004 | Sharp | |
| 6,931,784 | B1 | 8/2005 | Sutherland | |
| 7,316,095 | B1 * | 1/2008 | Petner | A01K 85/16 43/42.22 |
| 7,621,068 | B1 | 11/2009 | Renosky | |
| 8,028,464 | B2 | 10/2011 | Smith | |
| 8,146,288 | B2 | 4/2012 | Barczak | |
| 8,438,776 | B2 | 5/2013 | Tsai | |
| D692,520 | S | 10/2013 | Vainio | |
| 8,720,104 | B2 * | 5/2014 | Smith | A01K 85/00 43/42.22 |
| D713,924 | S | 9/2014 | Vainio | |
| D713,927 | S | 9/2014 | Albanese | |
| D767,080 | S | 9/2016 | Vainio | |
| 9,456,593 | B2 | 10/2016 | McWilliams | |
| 9,572,331 | B1 | 2/2017 | Reyment | |
| D781,995 | S | 3/2017 | Evans, Jr. | |
| D837,932 | S | 1/2019 | Brink | |
| 10,470,447 | B2 * | 11/2019 | Takahashi | A01K 85/16 |
| 2002/0050090 | A1 | 5/2002 | Lloyd | |
| 2002/0121043 | A1 * | 9/2002 | Hawkins | A01K 85/00 43/42.09 |
| 2004/0006909 | A1 * | 1/2004 | Essad | A01K 85/16 43/42.22 |
| 2004/0107626 | A1 | 6/2004 | Sims | |
| 2005/0086849 | A1 | 4/2005 | Perrick | |
| 2005/0246940 | A1 | 11/2005 | Jones | |
| 2007/0163165 | A1 | 7/2007 | Castro | |
| 2007/0283613 | A1 | 12/2007 | Woller, Sr. | |
| 2008/0010893 | A1 | 1/2008 | Polachek | |
| 2008/0104877 | A1 * | 5/2008 | Claverie, III | A01K 85/16 43/42.09 |
| 2008/0104881 | A1 | 5/2008 | Ito | |
| 2009/0183418 | A1 | 7/2009 | Dahlberg | |
| 2010/0212124 | A1 | 8/2010 | Denton | |
| 2010/0223833 | A1 | 9/2010 | Rigney | |
| 2011/0010984 | A1 | 1/2011 | Reynolds | |
| 2011/0047856 | A1 | 3/2011 | Gustafsson | |
| 2011/0247260 | A1 | 10/2011 | Schwartz | |
| 2011/0258906 | A1 | 10/2011 | Ford | |
| 2011/0296737 | A1 | 12/2011 | Peluso | |
| 2012/0144723 | A1 * | 6/2012 | Davidson | A01K 97/00 43/17.6 |
| 2012/0167446 | A1 | 7/2012 | Ul Yanov | |
| 2012/0317864 | A1 | 12/2012 | Vanacore, Jr. | |
| 2015/0082682 | A1 * | 3/2015 | Vashina | A01K 85/00 43/4.5 |
| 2015/0282464 | A1 | 10/2015 | Brink | |
| 2015/0342166 | A1 | 12/2015 | McWilliams | |
| 2019/0174732 | A1 | 6/2019 | Mahaffey | |

* cited by examiner

ADJUSTABLE DEPTH FISHING LURE

CROSS-REFERENCE TO RELATED APPLICATION

This application claims the benefit of U.S. Provisional Application No. 62/637,845, filed Mar. 2, 2018, which is incorporated herein by reference in its entirety.

FIELD

This disclosure relates to fishing lures and more particularly, artificial fishing lures having variable depth adjustability features.

BACKGROUND

Artificial fishing lures come in many shapes and sizes, and each lure has a different purpose. For example, artificial crankbait lures are cast out into the water and then retrieved, giving the lure a life-like sense of motion. Crankbait lures typically include a hard plastic body molded into the shape of a small fish. These lures generally have a lip that protrudes from the front of the lure that varies in size and length to and which dictates the swimming performance of the lure. For example, if the lip of the crankbait lure is short, the lure will swim at a shallow depth. If the lip of the crankbait lure is very long, the lure will swim at a deeper depth.

It is known that fish reside at various depths in the water column. By using a different length lip on a crankbait lure, specific fish can be targeted at different depths. The drawback to these lures however, is their singular max depth capabilities. For the most part, previous crankbait lures only had the ability to operate at one depth, and fishing at a different depth required the fisherman to change the crankbait lure.

Generally, fishermen carry a plurality of crankbait lures having a variety of lip sizes to properly target different depths. If the fisherman cannot locate a fish at one depth, the lure is removed from the line and another lure having a different lip length is connected to the line. This is both time consuming and requires fishermen to carry a plurality of lures.

DETAILED DESCRIPTION

An adjustable fishing lure is provided that includes a lure body having a slot, the slot includes a plurality of teeth. The fishing lure includes a lip that is received partially in the slot and is movable to predetermined positions relative to the lure body. The lip may include an eyelet for attachment to a fishing line. A locking member of the lip is configured to engage at least one of the plurality of teeth to fix the lip at one of the predetermined positions. The ability to adjust the position of the lip relative to the lure body allows the fishing lure to swim at various depths within the water column. Additionally, the engagement between the locking member and the at least one of the plurality of teeth provides a rigid connection that resists loading applied to the lip during use of the fishing lure. For example, the loading applied to the lip may be imparted by a line secured to the eyelet of the lip as the fisherman pulls on the fishing line and pulls the lure and a fish caught thereon through the water. As another example, the loading may be applied to the lip by the water's resistance to the fishing lure moving through the water. Further, the rigid connection between the lure body and the lip limits the lip from moving to different predetermined positions and altering the length of the lip during retrieval of the fishing lure.

In one embodiment, the lip includes an actuator of the locking member that is shiftable to disengage the locking member from the plurality of teeth in the lure body to move the lip to a different one of the predetermined positions. The actuator protrudes from an upper portion of the slot, and in some embodiments, may be shifted using a fisherman's thumb. To obtain the best odds of finding the fish, the fisherman first pre-determines what depth the target fish are and how deep the fisherman wants the lure to swim. Once the fisherman has chosen a depth, the fisherman can shift the actuator to disengage the locking member from the plurality of teeth and move the lip to the predetermined position corresponding with the chosen depth. The fisherman releases the actuator and the locking member engages with one or more of the plurality of teeth, providing a rigid connection to resist loading applied to the eyelet of the lip where the fishing line may be attached.

Figure 1:
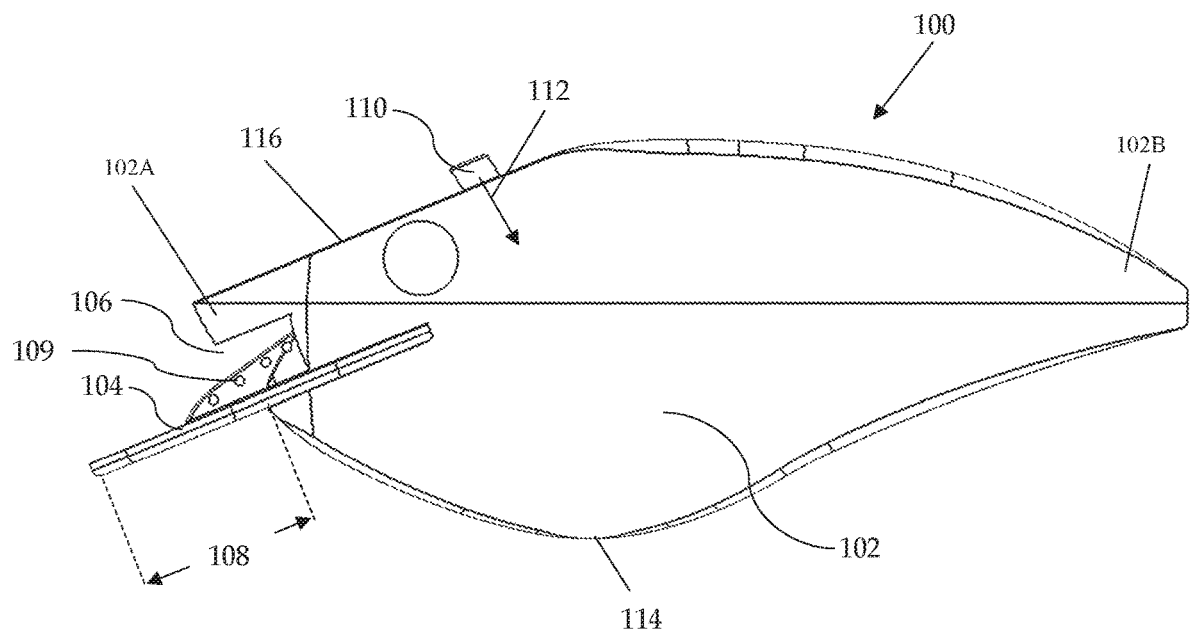
FIG. 1 is a left side elevational view of an adjustable depth fishing lure.

In FIG. 1, an adjustable fishing lure 100 is provided that includes a lure body 102 and a lip 104, wherein the lip 104 is partially received in a slot 106 of the body 102. The lure body 102 has a leading end portion 102A, a trailing end portion 102B, and a slot 106 that opens to the leading end portion 102A. In some embodiments, a length 108 of the lip 104 may be adjusted by shifting an actuator 110 of the lip 104 in direction 112 from a locked position to an unlocked position and disengage a rigid connection between the lip 104 and lure body 102 and permit the lip 104 to be moved to different predetermined positions. The lip 104 includes at least one eyelet 109 where a fisherman may attach a fishing line. In one embodiment, a hook loop is provided at position 114 to receive a hook. As the fisherman pulls the lure 100 through the water via a fishing line attached to the lip 104, a predator fish can bite the lure 100 and be hooked on the hook connected to the eyelet at position 114.

Figure 2:
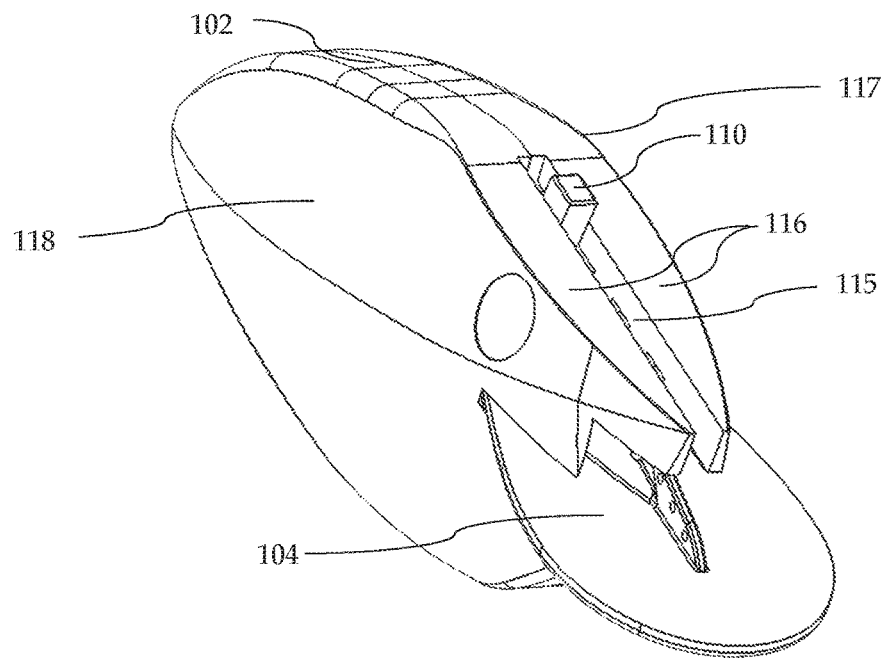
FIG. 2 is a front perspective view of the fishing lure of FIG. 1.

FIG. 2 is a front perspective view of FIG. 1, showing the actuator 110 protruding upwards through an upper portion 115 of the slot 106 and upstanding from an outer surface of the lure body 102, such as upper surface 116. In some embodiments, the lure body 102 may be formed from a plurality of assembled components, such as two halves 117, 118, and in other embodiments the lure body 102 may have a unitary one-piece construction.

Figure 3:
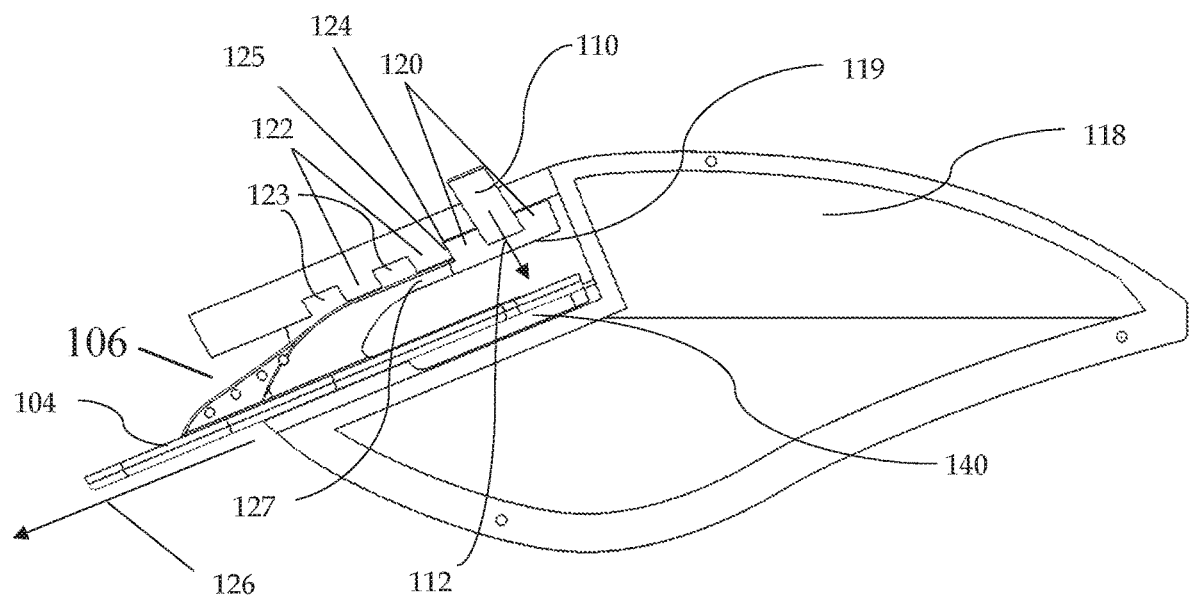
FIG. 3 is a left-side elevational view of the fishing lure of FIG. 1 with a left half of a body of the fishing lure removed to show a lip of the fishing lure in a rear position.

Regarding FIG. 3, a left-side elevational view of a right half 118 of the lure body 102 is provided showing a locking member 119 of the lip 104. The lip 104 includes a toothed portion 120 engaged with a plurality of teeth 122 of the slot 106. The slot 106 includes a plurality of recesses 123 located between the plurality of teeth 122 that correspond with and are configured to receive the toothed portion 120 of the locking member 119 to fix the lip 104 in the rear most predetermined position as shown in FIG. 3. The toothed portion 120 includes at least one confronting surface 124, and the plurality of teeth 122 includes a plurality of complementary surfaces 125. When the locking member 119 is engaged with the plurality of teeth, the confronting surface 124 of the toothed portion 120 abuts at least one complementary surface 125 of the plurality of teeth 122 to provide a rigid and secure connection to resist loading applied to the lip 104 by the fisherman pulling on the fishing line connected to the at least one eyelet 109 and/or a fish biting a hook connected to the lure body 102. The abutment of the confronting surface 124 with the complementary surface 125 limits the lip 104 from shifting in direction 126 outwards to a different predetermined position during retrieval of the fishing lure 100. In other embodiments, the plurality of teeth 122 may be rectangular or triangular, and the toothed portion 120 of the locking member 119 is configured to fit between and engage with the plurality of teeth 122.

In FIG. 3, the locking member 119 is biased into the locked position and engages the plurality of teeth 122 by an arm portion 127 of the lip 104. The fisherman may press the actuator 110 in direction 112 to cause the actuator 110 to be shifted downwards in direction 112 to flex the arm portion 127, shift the actuator to the unlocked position, and disengage the toothed portion 120 from the plurality of teeth 122 to permit the lip 104 to slide in the slot 106. The fisherman may then release the actuator 110 and the arm portion 127 biases the toothed portion 120 in a direction opposite direction 112. The arm portion 127 urges the toothed portion 120 into different recesses 123 where the at least one confronting surface 124 will contact and abut the at least one complementary surface 125 between the plurality of teeth 122 such that the toothed portion 120 is fixedly engaged with different teeth 122.

Figure 4:
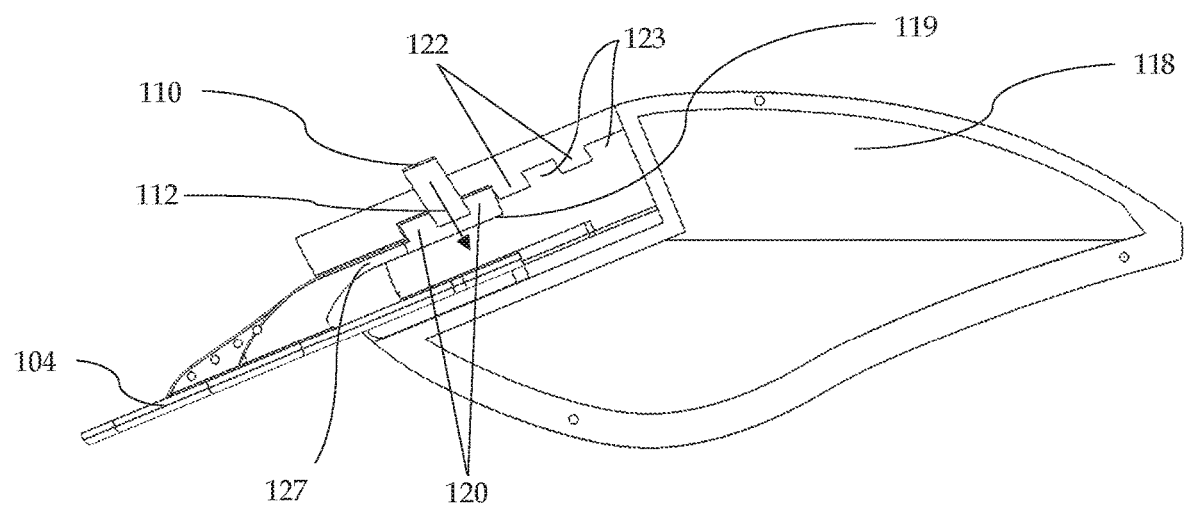
FIG. 4 is a view similar to FIG. 3 with the lip in a forward position.

With respect to FIG. 4, the toothed portion 120 of the locking member 119 is shown engaged with the plurality of teeth 122 when the lip 104 is in the front most predetermined position. As in FIG. 3, the actuator 110 of the locking member 119 may be shifted in direction 112 to flex the arm portion 127 and disengage the toothed portion 120 from the plurality of teeth 122 and permit the lip 104 to move relative to the lure body 102 to a different predetermined position.

Figure 5:
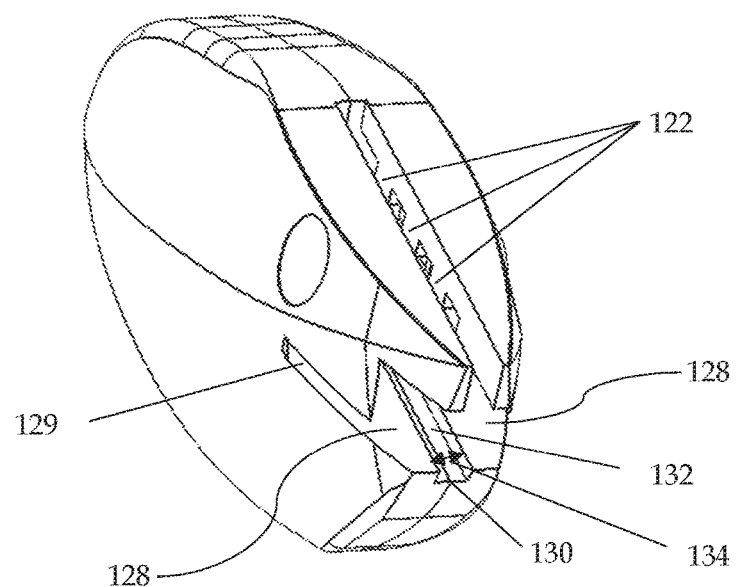
FIG. 5 is a front perspective view similar to FIG. 2 with the lip removed from a slot of the fishing lure body.
Figure 6:
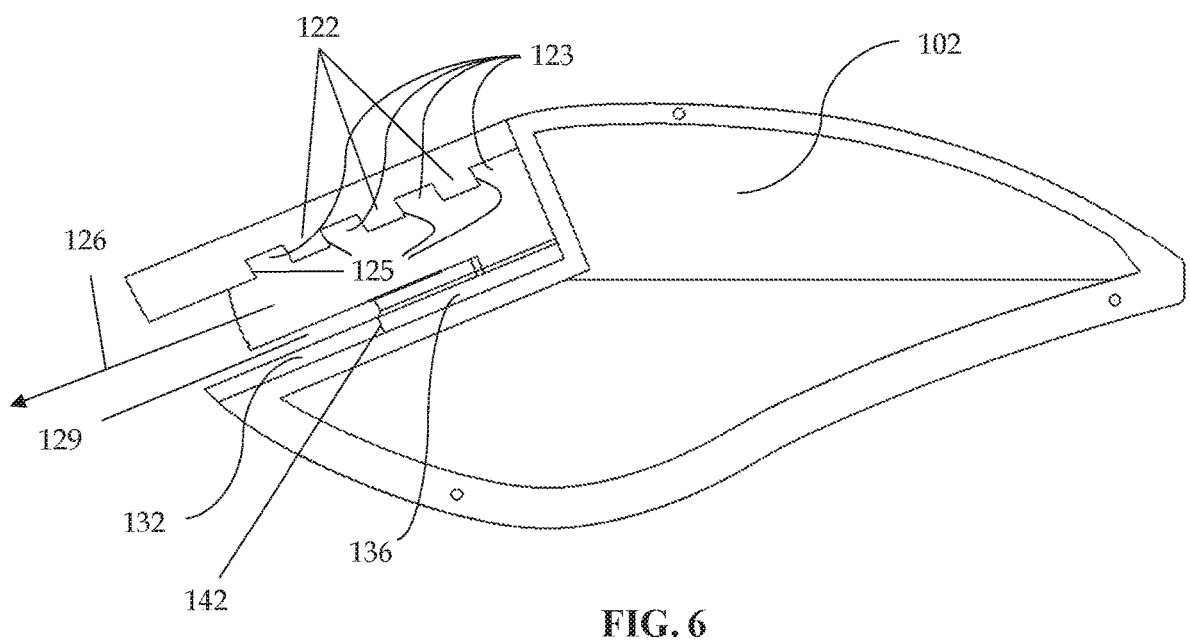
FIG. 6 is a view similar to FIG. 3 with the lip removed to show the teeth of the body.

In FIGS. 5 and 6, the lip 104 is removed from the slot 106 to show the slot 106 having an enlarged end 128 and an undercut 129. The slot 106 further includes a groove 130 having an outer portion 132 with a first width 134 and an inner portion 136 having a second width that is larger than the first width 134. When the lip 104 is partially received in the slot 106, a plate portion 138 (See FIG. 7C) of the lip 104 is slidably engaged with the undercut 129 of the slot 106. Additionally, the lip 104 includes a stop member 140 below the plate portion 138 that extends across and abuts a stop surface 142 (See FIG. 6) of the inner portion 136 to limit outward movement of the lip 104 in direction 126.

FIGS. 7A-D show different perspective views of the lip 104. The lip 104 may include assembled components and, in other embodiments, the lip 104 may have a unitary one-piece construction. The locking member 119 of the lip 104 includes the arm portion 127 extending away and spaced from the plate portion 138. In some embodiments, the arm portion 127 is made of a resilient material and resiliently flexes in response to the actuator 110 being shifted in direction 112. This in turn will withdraw the toothed portion 120 from the recesses 123 between the plurality of teeth 122, and once the toothed portion 120 is in clearance with the plurality of teeth 122, the lip 104 may then be moved to a different predetermined position relative to the lure body 102. The lip 104 may be made from a variety of materials such as plastics, e.g., polycarbonate, and metals, e.g., stainless steel.

Figure 7A:
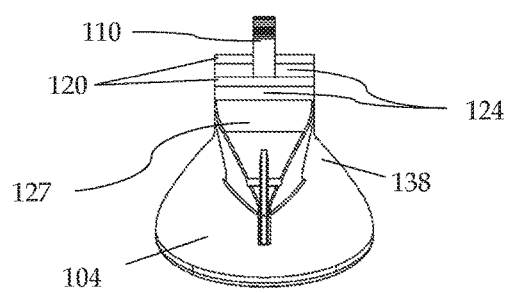
FIG. 7A is a front perspective view of the lip of the fishing lure of FIG. 1.
Figure 7B:
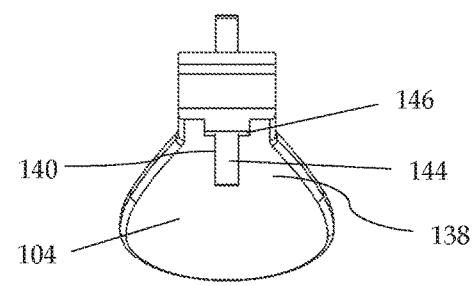
FIG. 7B is a rear perspective view of the lip of FIG. 7A.
Figure 7C:
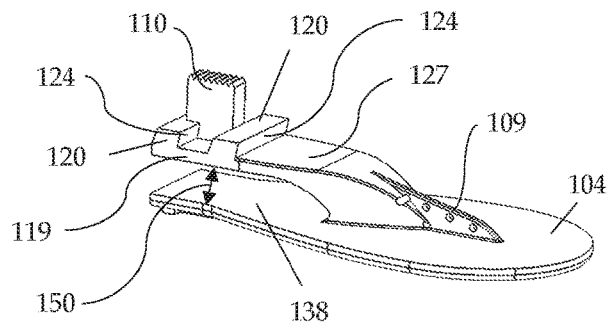
FIG. 7C is a right-side perspective view of the lip of FIG. 7A.
Figure 7D:
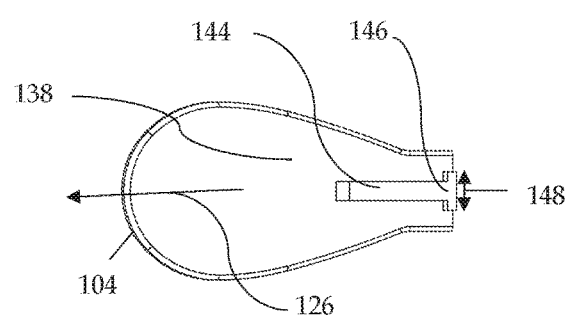
FIG. 7D is a bottom perspective view of the lip of FIG. 7A.

With reference to FIGS. 7B and 7D, the stop member 140 extends below the plate portion 138 and includes an alignment portion 144 and a stop portion 146. When the lip 104 is partially received in the slot 106, the alignment portion 144 is slidable within the outer portion 132 and the stop portion 146 is slidable within the inner portion 136. The stop portion 146 has a width 148 larger than the first width 134 of the outer portion 132. The stop portion 146 abuts the stop surface 142 and limits outward movement of the lip 104 in direction 126.

In one embodiment, the stop member 140 is T-shaped, where the stop portion 146 of the "T" defines a width 148 larger than the first width 134 of the outer portion 132 and limits outward movement of the lip 104 in direction 126 while the locking member 119 is disengaged from the plurality of teeth 122.

Regarding FIG. 7C, the arm portion 127 connects the locking member 119 to the plate portion 138, and the locking member 119 is spaced apart from the plate portion 138 via a gap 150. In some embodiments, the eyelet 109 includes multiple eyelets 109 for attaching the fishing line to different spots on the lip 104.

Figure 8:
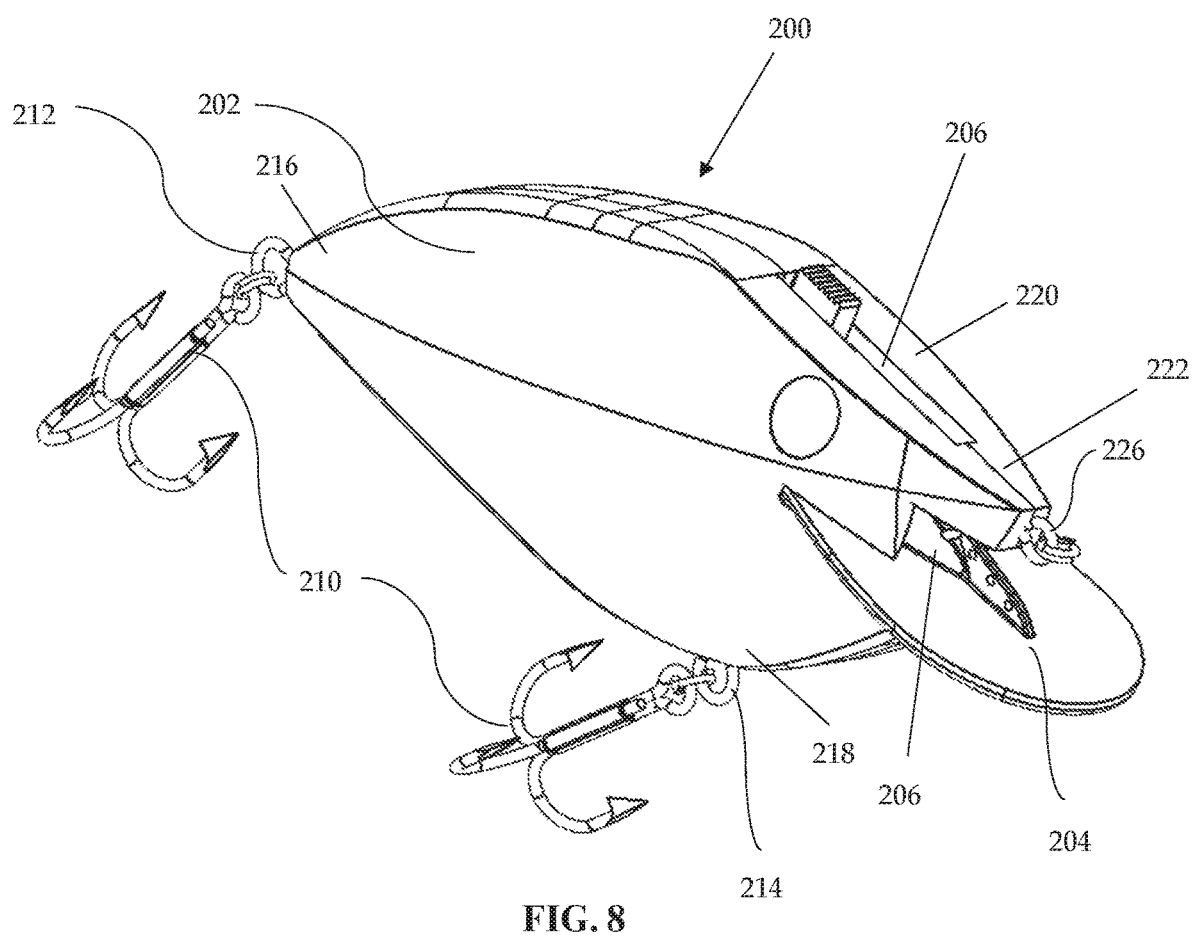
FIG. 8 is a right-side perspective view of another fishing lure.
Figure 9:
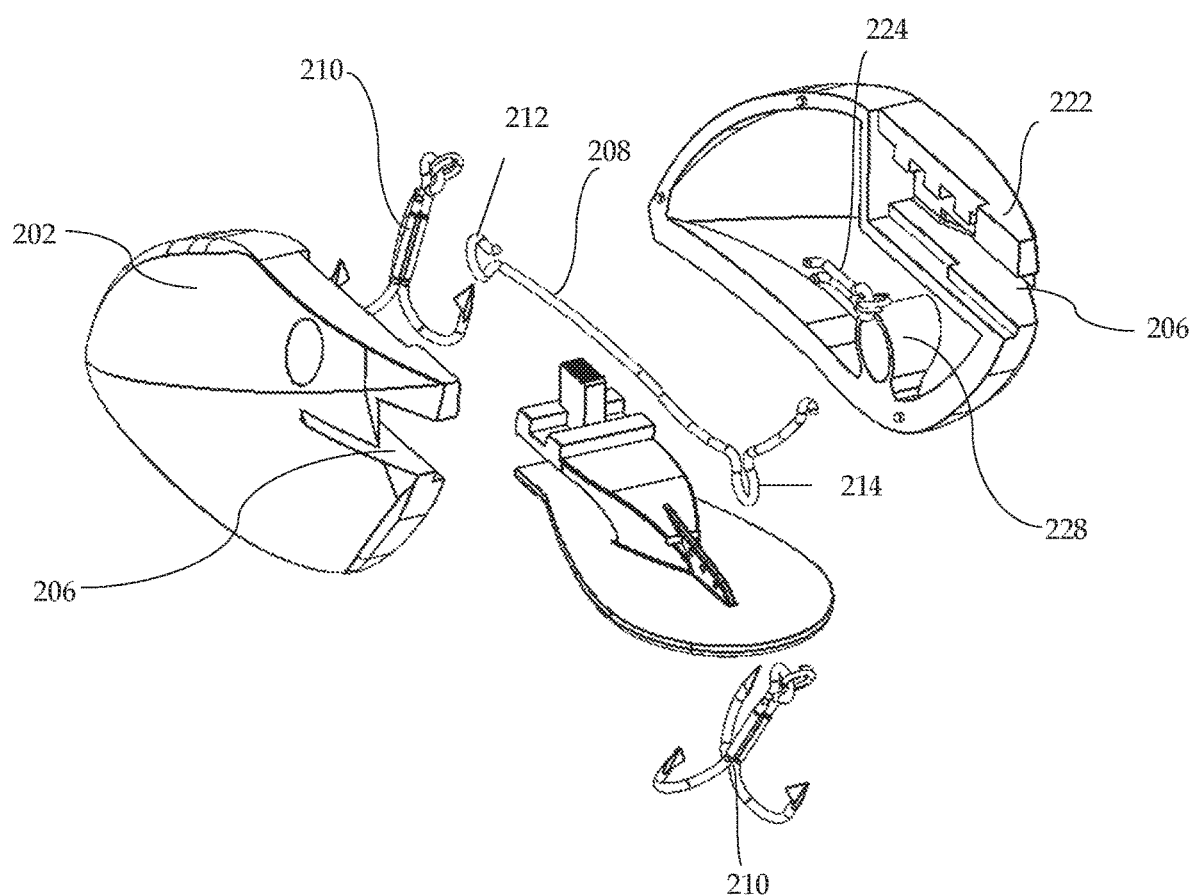
FIG. 9 is an exploded view of the fishing lure of FIG. 8.

With reference to FIGS. 8 and 9, a fishing lure 200 is provided that is similar in many respects to the fishing lure 100 discussed above such that differences between the two will be highlighted and discussed. The fishing lure 200 includes a body 202 and a lip 204, wherein the lip 204 is partially received in a slot 206 of the body 202. Further, the fishing lure 200 includes a rear wire 208 located partially inside the lure body 202 having at least one loop protruding outside of the lure body 202 to attach at least one treble hook 210. In FIG. 8, the rear wire 208 includes two hook loops, 212, 214. The lure body 202 has a treble hook 210 attached to a rear end portion 216 of the lure body 202 using hook loop 212 of the rear wire 208 and another treble hook 210 attached to a bottom portion 218 of the lure body 202 using hook loop 214 of the rear wire 208.

In other embodiments, the treble hooks 210 may be replaced with other fishing hooks, such as J-hooks. Additionally, in some embodiments, an upper surface 220 of the lure body 202 includes a cross member 222 that closes the upper portion of the slot 206 as shown in FIG. 8. The slot 206 extends upward through the upper surface 220 of the lure body 202 and outward through the front of the lure body 202 where the lip 204 is partially received. In one embodiment, the fishing lure 200 includes a front eyelet wire 224 (See FIG. 10) located partially inside the lure body 202. The front eyelet wire 224 is bent to form a loop 226 for being be attached to a fishing line as an alternative to the at least one eyelet of the lip 204.

With reference to FIG. 9, the rear wire 208 is shown having two hook loops 212, 214 extending outside of the lure body 202. The rear wire 208 is received in a groove in each of the halves of the lure body 202 so that the rear wire 208 is held between the lure body halves when they are joined together. The halves of the lure body 202 may be joined together by adhesive, welding, and/or fasteners as some examples. One half of the lure body 202 may include two or more pins that fit into a corresponding openings of the body 202 to assist in aligning the halves during assembly and providing a durable connection between the halves. The lure body 202 may be made of various materials including plastics, e.g., polycarbonate, and metals, e.g. stainless steel. The lure body 202 and the lip 204 may each be made using injection-molded plastic. The lure body 202 and the lip 204 may be made of the same or different material.

In one embodiment, the lure body 202 includes a compartment 228 to hold a ball bearing 230 to increase the balance of the fishing lure. The ball bearing 230 also rattles within the compartment 228 with movement of the lure 200 to attract fish.

Figure 10:
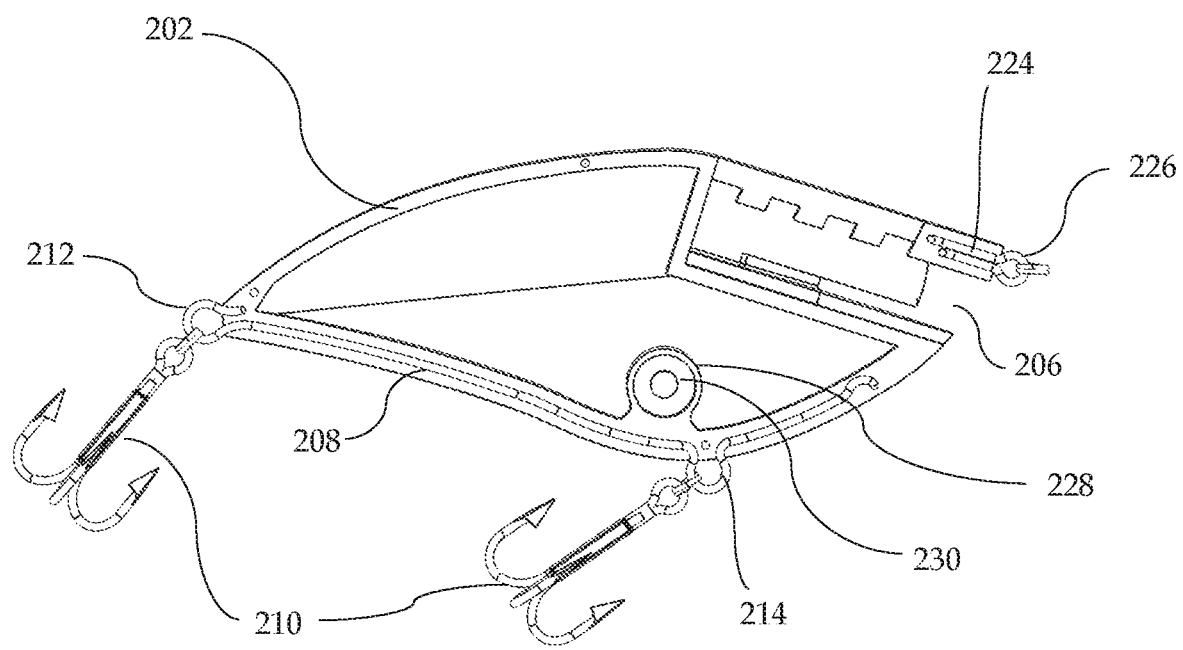
FIG. 10 is a right side elevational view of the fishing lure of FIG. 9 with the right half and a lip of the fishing lure removed.

Regarding FIG. 10, the rear wire 208 is shown partially inside the lure body 202 with the treble hooks 210 attached and the front wire 224 is shown partially inside the lure body 202 with loop 226 protruding outside of the lure body 202.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. An adjustable depth fishing lure comprising:
   a lure body having a leading end portion and a trailing end portion;
   an outer surface of the lure body;
   a slot of the lure body at the leading end portion and extending toward the trailing end portion, wherein the slot includes a portion that opens to the outer surface;
   a plurality of teeth of the slot;
   a lip received partially in the slot and shiftable along the slot to predetermined positions relative to the lure body, the positions including a first position toward the trailing end portion of the body wherein more of the lip is received in the slot and a second position toward the leading end portion of the body wherein less of the lip is received in the slot;
   a protruding member of the lip including a base portion and a free end portion;
   a locking member of the free end portion of the protruding member, the free end portion of the protruding member shiftable from an unlocked position wherein the locking member is disengaged from the teeth and the lip is shiftable between the predetermined positions to a locked position wherein the locking member engages at least one of the teeth and fixes the lip relative to the lure body at one of the predetermined positions; and
   an actuator of the free end portion of the protruding member extending through the slot portion and proud of the lure body outer surface, the actuator pressable to shift the free end portion from the locked position to the unlocked position.

2. The adjustable depth fishing lure of claim 1, wherein the lip includes an eyelet.

3. The adjustable depth fishing lure of claim 1, wherein the slot is elongated and extends along the lure body outer surface.

4. The adjustable depth fishing lure of claim 1, wherein the lip includes a plate portion, the protruding member includes an arm portion extending between the base portion and the free end portion, and the arm portion is spaced from the plate portion.

5. The adjustable depth fishing lure of claim 1, wherein the slot includes a groove including an outer portion having a first width and an inner portion having a second width larger than the first width, and
   the lip includes a stop member extending across the groove inner portion and having a width greater than the first width to limit outward sliding of the lip.

6. The adjustable depth fishing lure of claim 1, wherein the lip has a unitary one-piece construction.

7. The adjustable depth fishing lure of claim 1, wherein the lure body includes a compartment; and
   a ball bearing in the compartment.

8. The adjustable depth fishing lure of claim 1, wherein each tooth of the plurality of teeth is square and the locking member includes a toothed portion configured to fit between the teeth of the slot.

9. The adjustable depth fishing lure of claim 1, wherein the lure body comprises an assembled first half and a second half.

10. The adjustable depth fishing lure of claim 1, further comprising at least one wire partially in the lure body and including at least one hook loop located outside of the lure body.

11. The adjustable depth fishing lure of claim 10, further comprising at least one J-hook connected to the at least one hook loop of the at least one wire.

12. The adjustable depth fishing lure of claim 11, further comprising at least one treble hook connected to the at least one hook loop of the at least one wire.

13. The adjustable depth fishing lure of claim 1 wherein the protruding member includes an arm portion connecting the free end portion to the base portion, the arm portion configured to deflect in response to the actuator shifting the free end portion from the locked position to the unlocked position.

14. The adjustable depth fishing lure of claim 13 wherein the arm portion resiliently biases the free end portion from the unlocked position toward the locked position.

* * * * *